United States Patent
Auslander et al.

(10) Patent No.: US 7,536,553 B2
(45) Date of Patent: *May 19, 2009

(54) METHOD AND SYSTEM FOR VALIDATING A SECURITY MARKING

(75) Inventors: Judith D. Auslander, Westport, CT (US); Robert A Cordery, Danbury, CT (US); Claude Zeller, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 1379 days.

This patent is subject to a terminal disclaimer.

(21) Appl. No.: 10/128,113

(22) Filed: Apr. 24, 2002

(65) Prior Publication Data

US 2003/0005303 A1    Jan. 2, 2003

(51) Int. Cl.
*H04L 9/00* (2006.01)

(52) U.S. Cl. .................. 713/176; 713/161; 235/462.34; 235/491; 283/67; 283/72; 283/94; 705/57; 705/405; 380/201

(58) Field of Classification Search ............... 713/176, 713/161; 235/454, 491; 283/74, 91, 94; 382/112; 380/55, 201; 705/57, 405, 408
See application file for complete search history.

(56) References Cited

U.S. PATENT DOCUMENTS

| | | | | |
|---|---|---|---|---|
| 3,928,226 A | * | 12/1975 | McDonough et al. | .. 252/301.35 |
| 4,015,131 A | | 3/1977 | McDonough et al. | ....... 250/461 |
| 4,504,084 A | * | 3/1985 | Jauch | .......... 380/54 |
| 4,649,266 A | | 3/1987 | Eckert | ........ 235/432 |
| 4,888,803 A | | 12/1989 | Pastor | ........ 380/51 |
| 4,891,504 A | * | 1/1990 | Gupta | ........ 235/375 |
| 4,937,636 A | * | 6/1990 | Rees et al. | .......... 399/232 |
| 5,084,205 A | | 1/1992 | Auslander | ........ 252/301.16 |
| 5,093,147 A | * | 3/1992 | Andrus et al. | .......... 427/7 |
| 5,390,251 A | | 2/1995 | Pastor et al. | ........ 380/21 |
| 5,421,869 A | * | 6/1995 | Gundjian et al. | ......... 106/31.19 |
| 5,502,304 A | | 3/1996 | Berson et al. | ........ 250/271 |
| 5,514,860 A | | 5/1996 | Berson | ........ 235/468 |
| 5,516,362 A | * | 5/1996 | Gundjian et al. | ......... 106/31.32 |
| 5,525,798 A | | 6/1996 | Berson et al. | ........ 250/271 |
| 5,554,842 A | | 9/1996 | Connell et al. | ........ 235/491 |

(Continued)

FOREIGN PATENT DOCUMENTS

GB    1407065    9/1975

(Continued)

*Primary Examiner*—Nasser G Moazzami
*Assistant Examiner*—Shanto M Abedin
(74) *Attorney, Agent, or Firm*—Charles R. Malandra, Jr.; Angelo N. Chaclas

(57) ABSTRACT

A method and system for authenticating an item by using a security marking. The security marking is provided on the item with an OVD ink capable of absorbing light in a visible wavelength range to appear visibly black and producing a red fluorescent emission under ultraviolet excitation. Under visible light illumination and ultraviolet excitation, a visible image and a fluorescent image are obtained from the security marking using image scanners. The images are compared to find a substantial match with each other. The security marking can be a postage indicium, a barcode, a symbol, a message or an image. The item to be authenticated can be a mailpiece, a banknote, a tag, a ticket, a document, an identification card, or the like.

28 Claims, 7 Drawing Sheets

U.S. PATENT DOCUMENTS

| | | | | |
|---|---|---|---|---|
| 5,569,317 | A | | 10/1996 | Sarada et al. ............... 106/21 |
| 5,614,008 | A | * | 3/1997 | Escano et al. ............... 523/161 |
| 5,681,381 | A | | 10/1997 | Auslander et al. ............ 106/21 |
| 5,731,574 | A | | 3/1998 | Bodie et al. ............... 235/375 |
| 5,781,438 | A | | 7/1998 | Lee et al. ................. 364/464 |
| 5,812,666 | A | | 9/1998 | Baker et al. ............... 380/21 |
| 5,867,586 | A | * | 2/1999 | Liang ...................... 382/112 |
| 5,982,896 | A | | 11/1999 | Cordery et al. ............. 380/21 |
| 6,006,991 | A | * | 12/1999 | Faklis et al. .............. 235/462.06 |
| 6,013,307 | A | * | 1/2000 | Hauser et al. .............. 427/7 |
| 6,039,257 | A | | 3/2000 | Berson et al. .............. 235/468 |
| 6,079,327 | A | | 6/2000 | Sarada ..................... 101/93 |
| 6,125,357 | A | | 9/2000 | Pintsov .................... 705/408 |
| 6,142,380 | A | | 11/2000 | Sansone et al. ............. 235/487 |
| 6,157,919 | A | | 12/2000 | Cordery et al. ............. 705/60 |
| 6,270,213 | B1 | * | 8/2001 | Sansone et al. ............. 347/100 |
| 6,271,946 | B1 | | 8/2001 | Chang et al. ............... 359/124 |
| 6,286,761 | B1 | * | 9/2001 | Wen ........................ 235/468 |
| 6,354,501 | B1 | * | 3/2002 | Outwater et al. ............ 235/462.01 |
| 6,373,965 | B1 | * | 4/2002 | Liang ...................... 382/112 |
| 6,405,929 | B1 | * | 6/2002 | Ehrhart et al. ............. 235/486 |
| 6,793,721 | B2 | * | 9/2004 | Shen et al. ................ 106/31.2 |
| 6,902,265 | B2 | * | 6/2005 | Critelli et al. ............ 347/101 |
| 7,079,230 | B1 | * | 7/2006 | McInerney et al. ........... 356/71 |
| 7,114,657 | B2 | * | 10/2006 | Auslander et al. ........... 235/491 |
| 2001/0054644 | A1 | * | 12/2001 | Liang ...................... 235/454 |
| 2003/0112423 | A1 | * | 6/2003 | Vig et al. ................. 356/71 |

FOREIGN PATENT DOCUMENTS

WO          0250802  A2    6/2002

* cited by examiner

METHOD AND SYSTEM FOR VALIDATING A SECURITY MARKING

CROSS REFERENCE TO RELATED APPLICATIONS

The matter is related to U.S. patent application Ser. No. 10/119,885, entitled "Homogeneous Optically Variable Water Based Ink Compositions", now U.S. Pat. No. 6,827,769, and U.S. patent application Ser. No. 10/143,468, entitled "Heterogeneous Optically Variable Water Based Ink Compositions", now U.S. Pat. No. 6,793,723, assigned to the assignee of the present invention and filed even date herewith.

FIELD OF THE INVENTION

The present invention relates generally to the authentication of an item, such as a banknote, a certificate or a mailpiece and, in particular, to authenticate the item by validating a security marking provided thereon.

BACKGROUND OF THE INVENTION

It is generally known to employ automated detectors which are responsive to images with high reflective contrast in the visible region of the spectrum for the machine processing of various types of information-bearing tickets, tags, labels, postage indicia and similar security markings. It is further known to employ automated detectors that are responsive to fluorescent emissions of security markings resulting from excitation at a shorter wavelength such as ultraviolet (UV) excitation. For example, in the postage meter art, mail pieces carrying postage indicia printed with fluorescent ink enhance the machine processing of the mail. In the United States and Canada, automatic equipment correctly faces or orients individual mail pieces by detecting red-fluorescence of postal indicia attached to mail pieces. Postal Service facing equipment employs a simple detector to locate the fluorescence. This detector does not verify that the fluorescence and the indicium image are physically coincident, thus limiting the ability of the detector to verify the authenticity of the security marking. As used herein, the term red-fluorescence refers not to the visible color of the ink but to fluorescence in the red region of the spectrum.

"Fluorescent security marking", as used herein, refers to a security marking that fluoresces in a defined region of the spectrum upon exposure to a shorter wavelength excitation light such as UV light. The shift in wavelength between the incident excitation light and the fluorescent emission clearly distinguishes fluorescence from direct reflection. Fluorescent security markings are effectively applied to the detection of forged tickets, securities, identification cards, security papers, and the like. The difficulty of copying the fluorescence of security markings deters copying and provides forensic evidence of counterfeits. Among the applications of these security markings are the detection of articles, production marking, and automatic article identification. Intensity of the fluorescence is important to the success of these applications.

A counterfeiter without access to a printer with machine-readable fluorescent ink can produce a security mark that fluoresces and is machine-readable by printing the copied indicium over a fluorescent background, or by applying a fluorescent material over the copied indicium. In either case, the original and copied indicia are distinguishable. A forensic verifier system will make this distinction as described herein.

A manual forensic detection system can be simply a visible light source and an ultraviolet source with a switch that can switch between the two sources. An operator can view the indicium under the two light sources and verify the fluorescence of the image and the non-fluorescence of the background under ultraviolet illumination.

When an original security marking is illuminated with visible light, the image is dark against the bright background of the paper. When the original security marking image is illuminated with the ultraviolet light source, the image is bright against the low fluorescence background of the paper. Similarly, a copied security marking illuminated with visible light appears dark against a light background. Contrary to the properties of an image of an original security marking under ultraviolet illumination, a copied security marking printed on a fluorescent background or overprinted with fluorescent material and illuminated with ultraviolet light will show a dark image against the bright fluorescent background.

Rotary and other letterpress postage meters imprint the indicium on an envelope with a platen using an ink impregnated into a foam or other porous media. Red-fluorescent colored inks for letterpress meters include red, blue, green and black inks. For example, U.S. Pat. Nos. 2,681,317; 2,763,785; 3,230,221; 3,560,238; 3,928,226 and 4,015,131 disclose red-fluorescent inks for this purpose. These inks, in general, have a non-aqueous solvent-based vehicle system with a low vapor pressure, and have a high solid concentration, high viscosity, high boiling temperature and low surface tension. Letterpress technology lacks the ability of digital printing to print variable information. These letterpress inks therefore cannot be used in inkjet printers, which require stable solutions or stable dispersions with small particles, low viscosity and a specified surface tension. The viscosity of the liquid inks can vary from about 1.5 to 15 centipoise (cps) in current piezoelectric inkjet printers and from about 1 to 5 cps in thermal inkjet printers. The desirable surface tension of inkjet printer inks is between 30 to 50 dynes/cm. Examples of such red-colored, aqueous red-fluorescent inks are disclosed in U.S. Pat. No. 5,681,381. The disclosed inks fulfill USPS requirements for franking while being compatible with use in an inkjet printer. These inks are stable for extended periods of time. The formulations of these inks are based on water, co-solvent and penetrant solutions of water-soluble fluorescent toners. These inks are designed to achieve the required fluorescence intensity by limiting optical absorption, resulting in an optical density lower than that normally required for machine readability.

Postage indicia and franking machines have been developed to make use of digital printing and especially inkjet printing. An example is the Personal Post™ Postage Meter, which is manufactured by Pitney Bowes Inc. of Stamford, Conn. It is known in the art to print red colored, red-fluorescent indicia with variable data using digital printers. Digitally printed indicia provide significant advantages over letterpress indicia. Inkjet printing provides a means of printing indicia with high-density variable information. Pitney Bowes' Post-Perfect meter produces a red-colored, red-fluorescent indicium with variable data by thermal transfer printing, while Personal Post Office produces red-colored, red-fluorescent indicia by inkjet printing. The USPS IBIP program allows the use of a black, machine-readable indicia. The Post Office equipment typically orients mail pieces bearing IBIP indicia using a facing identification mark or by a fluorescent tag added to the indicium. Postal services employ the machine-readable variable information for value added services, for cryptographic authentication of the indicium and for obtaining marketing information. Compared to letterpress technology, digital printers can provide print quality and contrast that does not decrease with the number of prints. The images can be printed at high resolution, high quality and at high speeds by direct, non-impact print engines. These inks have additional advantages for security markings since they may include penetrating solvents that cause the selective penetration of fluorescent component into the paper. This selective penetration provides rubbing and scratch resistance to the fluorescent component of the security markings.

Another problem is that the use of inkjet printing for postage franking is presently restricted, to some extent, by the lack of inks functional with inkjet technology that are simultaneously suitable for franking and machine-readability.

Postal services employ the information printed in the indicium for security and marketing purposes, as well as for processing the mail. In particular, the Information-Based Indicia Program (IBIP) of the USPS contains high-density, variable, cryptographically protected information in a two-dimensional bar code. To capture this information, postal scanning equipment must efficiently detect and read the information-based indicium. Postal indicia printed on various substrates have to display sufficient contrast in reflection to enable machine-readability. For example on dark substrates, such as Kraft envelopes with reflectance between 0.45 and 0.6, it is very difficult to achieve the desired contrast with red inks. Therefore, there is a strong need for printing security markings which exhibit high contrast, preferably black, and simultaneously red-fluorescence. However, red-fluorescent inks usually do not have enough contrast to be reliably read by optical character recognition (OCR) equipment, bar code readers and other types of machine vision technology. These systems often have illumination and detection systems in the red region of the spectrum.

A drawback of fluorescent security features is that there are a large variety of commercially available organic luminescent compounds. Common examples are the optical brighteners and commercially available colored-fluorescent materials and inks. Fraudulent replication of indicia would only demand substitution of the authentic material with a luminescent substance that emits light of a similar color. Thus, it is advantageous to provide luminescent inks with unique optical properties that cannot be simulated with materials that are easily available. The present invention provides inks with such unique optical properties.

Furthermore, in the mailpiece security system based on digital indicia, if the postage indicium is duplicated and produced on more than one mailpiece, it is very difficult for the Postal Service to tell which, among the mailpieces having identical indicium, has the original indicium.

Thus, it is advantageous and desirable to provide a method and a system to provide added security to the mailpiece, which can then be used to distinguish between mailpiece(s) that are legitimately paid for and those that are not.

SUMMARY OF THE INVENTION

It is a primary object of the present invention to authenticate an item, such as a mailpiece, using a security marking, which is difficult to duplicate. The security marking can be a postage stamp or indicium or other printed image. This object can be achieved by providing the security marking using an ink capable of absorbing visible light and producing a fluorescent emission under ultraviolet excitation.

An ink property which is not commonly available is the simultaneous presence of a dark color (preferably black) visually different than the color of fluorescence and fluorescence. This property belongs to the non-iridescent, photosensitive Optically Variable Device (OVD) category, which is difficult to counterfeit. The OVD categorization results from a normal black appearance when illuminated with visible light, but red-fluorescence under UV light. This difference is predictable, reversible and reproducible under well-defined conditions. The subject invention provides an ink which fluoresces in red and also has high optical density throughout the visible spectrum so that it can be read by a human operator or by a machine vision system. The high contrast provided by the dark color allows commercial scanners to image documents or indicia printed with this ink, even on dark colored envelopes such as Kraft envelopes. The absorption at all wavelengths makes the required contrast achievable under a red filter and red illumination on ubiquitous Kraft, brown envelopes. Such OVD properties can be integrated into the document because of their normal black appearance. Therefore the OVD are covert security markings, looking indistinguishable from ubiquitous black prints but hiding the fluorescent features. Control of the manufacture and supply of these Photosensitive Optically Variable inks provide a significant barrier to undetectable copying.

According to the first aspect of the present invention, a method for authenticating an item having a surface for providing a security marking thereon, wherein the security marking is provided with an ink capable of absorbing light in a visible wavelength range to appear visibly black and producing a fluorescent emission having a first wavelength under excitation illumination having a second wavelength shorter than the first wavelength, said method comprising the steps of:

acquiring a first image of the security marking in the visible wavelength range under illumination of visible light;

acquiring a second image of the security marking from the fluorescent emission under excitation illumination; and verifying authenticity of the item using the first image and the second image.

Preferably, the verifying step comprises determining that the first and second images are physically coincident.

Preferably, the verifying step comprises comparing the first image to the second image for determining a match between the first image and the second image.

Preferably, the fluorescent emission is a red fluorescent emission.

Preferably, the excitation illumination is ultraviolet excitation.

The authenticating method can be carried out visually in that the first and second images are compared by human eyes.

Preferably, when the authenticating method is carried out using an apparatus, the comparing step comprises the steps of obtaining a value representative of a correlation between the first image and the second image, and comparing the value to a predetermined value stored in the apparatus.

Preferably, the ink can be used in an inkjet printer for providing the security marking.

Preferably, the absorption of visible light in a wavelength range is substantially between 390 nanometers and 680 nanometers, and the first image appears black, dark gray or dark blue, or a combination thereof.

Preferably, the fluorescent emission has a range of wavelengths, which is longer than 580 nanometers.

Preferably, when the item comprises a mailpiece, the security marking comprises a postage stamp or indicium. It is also possible that the securing marking comprises a promotional message, a return address or a mailing address.

Preferably, when the item is a banknote, a document, a certificate, a tag, an identification card or badge, or a ticket, the security marking comprises a graphic design, one or more alphanumerical symbols, a bar code, or other image.

According to the second aspect of the present invention, a system for authenticating an item having a surface for providing a security marking thereon, wherein the security marking is provided with a medium capable of absorbing light in the visible wavelength range to appear visibly black under illumination of visible light, and producing a fluorescent emission under excitation illumination of shorter wavelength, said system comprising:

a first means, responsive to the visible light, for acquiring a first image of the security marking for providing a first signal indicative of the first image;

a second means, responsive to the fluorescent emission, for acquiring a second image for providing a second signal indicative of the second image; and a third means, responsive to the first signal and the second signal, for comparing the first signal to the second signal for determining a match between the first image and the second image.

Preferably, the third means comprises a correlating device for obtaining a value indicative of the match between the first image and the second image, and the value is used to determine the match based on a predetermined value.

Preferably, the first means comprises an image scanner, or a digital camera.

It is possible that the first means comprises a film camera, or a video camera.

Preferably, the second means comprises an image scanner, or a digital camera.

It is possible that the second means comprises a film camera or a video camera.

According to the third aspect of the present invention, a security marking provided on an item for authentication of the item, characterized in that the security marking is made from a medium capable of absorbing light in the visible wavelength range to appear visibly black under illumination of visible light, and producing a red fluorescent emission under ultraviolet excitation, for providing a visible image under illumination of visible light and producing a fluorescent image under excitation illumination.

The present invention will become apparent upon reading the description taken in conjunction with FIGS. 1a to 4.

DETAILED DESCRIPTION OF THE INVENTION

Figure 1A:
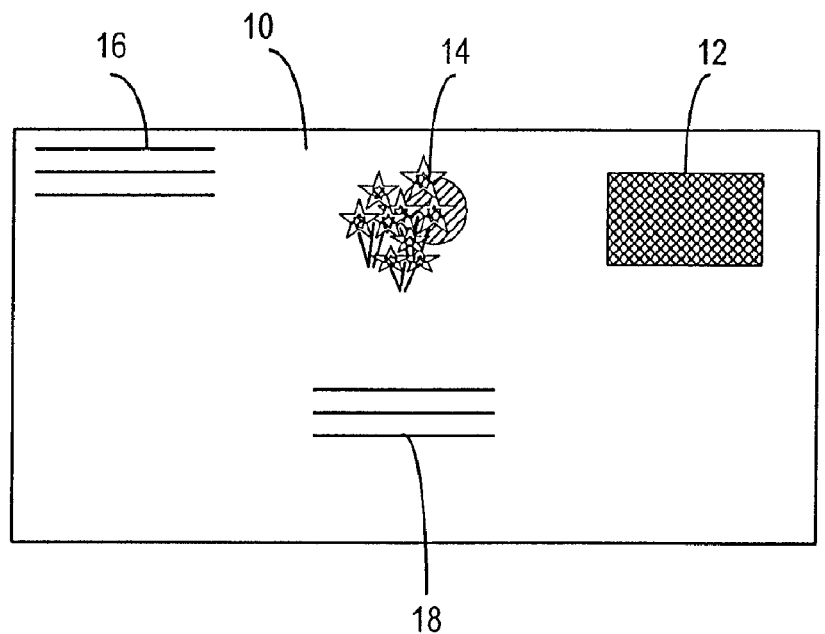
FIG. 1a is a diagrammatic representation illustrating a mailpiece having one or more security markings provided thereon.

FIG. 1a illustrates a mailpiece 10 having a postage stamp or indicium 12, a promotional message 14, a mailing address 18 and a return address 16. In order to determine whether the postage stamp or indicium 12 is a valid one or an illegally produced duplicate, it is preferred that the postage stamp or indicium be printed with a special ink. In particular, the ink is capable of absorbing visible light and producing a fluorescent emission upon ultraviolet excitation. Two examples of the special ink are listed in Table I and Table II below. Because the ink is capable of absorbing visible light, it produces a visible image that can be acquired in a Post Office using an image scanner that is currently used to acquire the image of an indicium made in a regular ink. Furthermore, the USPS also uses franking machines that can detect red fluorescence. Thus, an indicium printed with an ink that includes OVD properties (referred to herein as an OVD ink) can be processed by the USPS without modification of currently available equipment. Postage indicia and franking machines have been developed to make use of digital printing and especially inkjet printing. Thus, preferably, the OVD ink can be used on digital printers including inkjet printers.

Figure 1B:
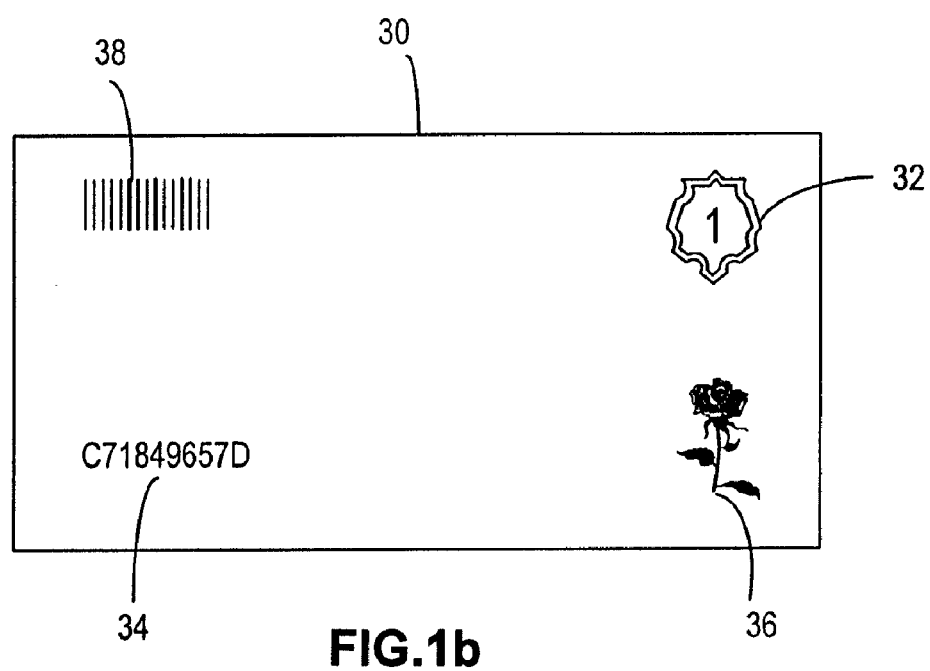
FIG. 1b is a diagrammatic representation illustrating a non-mail item having one or more security markings provided thereon.

FIG. 1b illustrates a non-mail item 30, such as a ticket, a tag, a currency note, a banknote, a certificate, an identification badge or card, a document or the like. For example, the security marking can be provided on the non-mail item 30 as one or more alphanumeric symbols 34, a graphic design 32, the likeness of an object 36, or a barcode 38. The security marking on the non-mailed item 30 can be verified by comparing the visible image and the fluorescent image produced from the security marking in a similar way to the security marking on a mailpiece.

The term Photosensitive Optically Variable (POV) security marking as used herein refers to a printed visually black or dark gray machine-readable information-bearing marking that fluoresces in a specific wavelength range when excited with a shorter wavelength light. The POV security marking exhibits visual light absorption throughout the entire visual spectrum including the red region of the visible spectrum where red inks are invisible to typical automatic scanning systems. These inks will achieve acceptable PCS (Print Contrast Signal) on dark papers such as Kraft or Manila.

Figure 2A:
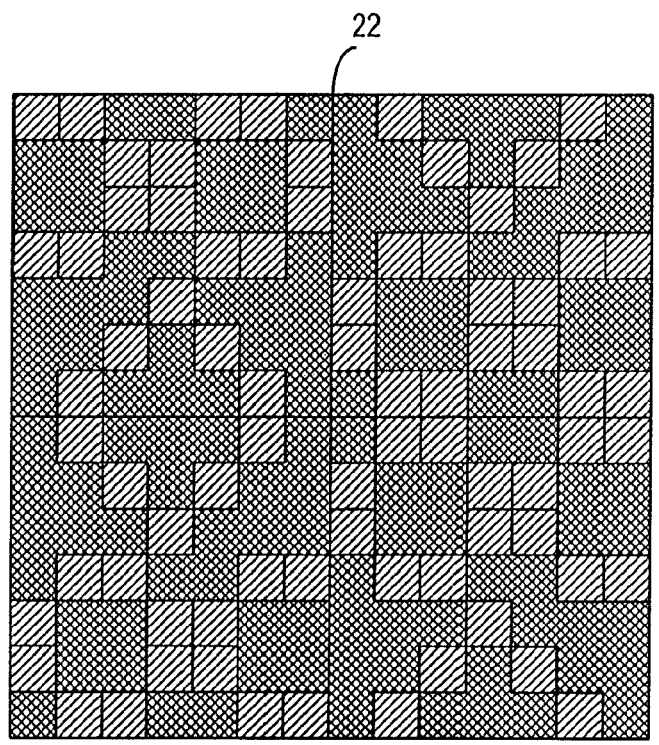
FIG. 2a is a diagrammatic representation illustrating a fluorescent image of the security marking under ultraviolet excitation.
Figure 2B:
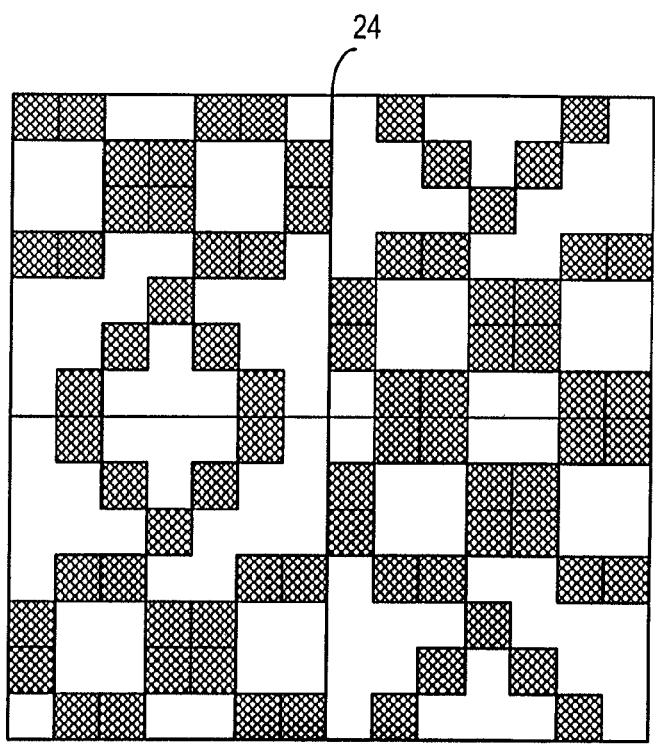
FIG. 2b is a diagrammatic representation illustrating a visible image of the security marking under visible illumination.

FIGS. 2a and 2b show machine-scanned images 22 and 24 of a POV security marking including a DataMatrix bar code. Any other symbology such as a one-dimensional bar code, other types of two-dimensional bar code, printed watermarks, or OCR characters may be employed in a POV security marking. The image scanned in reflection 22 was obtained by illuminating the marking with visible light. The low reflectance of the black ink results in dark areas of the scanned image corresponding to printed areas of the security marking. The image scanned in fluorescence 24 is obtained by viewing the visible red-fluorescent emissions under ultraviolet (UV) illumination. The scanned image 24 shows that the security marking emits visible light when illuminated with UV light resulting in light areas in the scanned image corresponding to the printed areas. Comparison of images 22 and 24 shows that the fluorescing image is a negative of the reflective image, i.e., there is a strong negative correlation between the two images.

Figure 3:
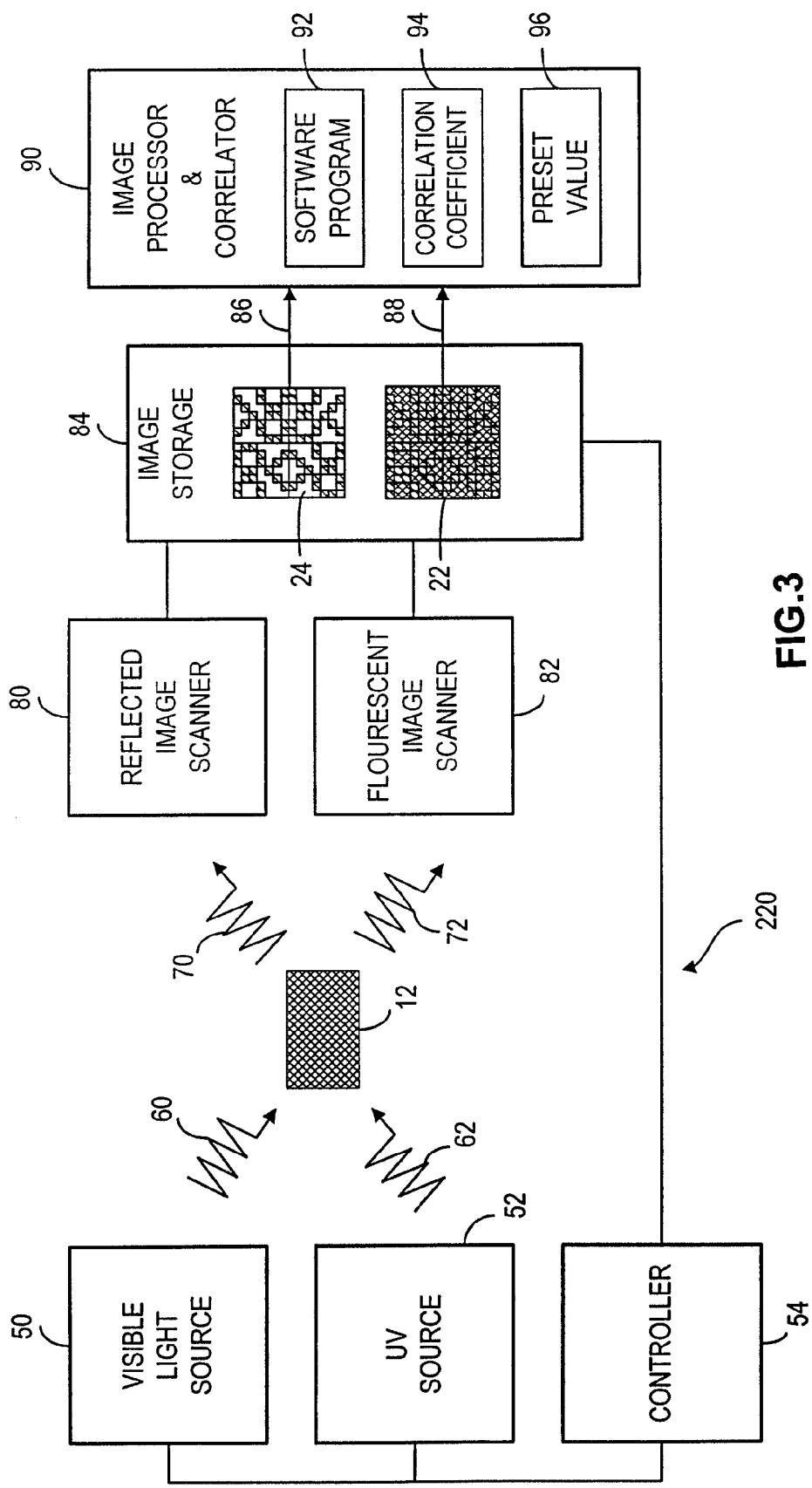
FIG. 3 is a diagrammatic representation illustrating a system for authenticating an item based on a security marking provided on the item, according to the present invention.

The fluorescent image 22 may be produced by the postage stamp or indicium 12 or other security marking 14, 16, 18, 32, 34, 36 under ultraviolet excitation. FIG. 2b illustrates a visible image 24 produced by the same security marking when the security marking is illuminated by visible light. FIGS. 2a and 2b are used to demonstrate that because the postage stamp or indicium 12 or other security marking 14, 16, 18, 32, 34, 36 is printed with an OVD ink capable of absorbing visible light and producing a fluorescent emission under ultraviolet excitation, the fluorescent image 22 and the visible image 24 are correlated with each other. If the postage stamp or indicium 12 or other security marking 14, 16, 18, 32, 34, 36 is illegally duplicated by a duplicating means, such as a photocopier, the fluorescent image 22 is usually not obtainable. In order to determine the validity of the postage stamp or indicium 12 or other security marking 14, 16, 18, 32, 34, 36, it is possible to visually compare the fluorescent image 22 and the visible image 24 to find a match therebetween. However, it is preferred that the images 22 and 24 be compared by a comparing means, as shown in FIG. 3.

Forensic characteristics are important to value metering applications such as postal payment and to other security applications. Other security applications of fluorescent inks include security papers and documents. Thus even after the removal of the visible dark color the remaining fluorescent image 104 will provide forensic evidence of what was printed. In the present invention, the difference in penetration between the fluorescent and non-fluorescent components provides forensic evidence of the presence of the marking after the visible components have been removed.

A security marking printed with a general purpose black ink is easily copied or modified. Verification of the authenticity of the data such as by verifying a cryptographic digital signature included in the bar code data can detect data modification, but not copying. The machine-readable fluorescent ink disclosed herein provides a barrier against undetectable copying. Frequently, fluorescence is added to colored inks to increase the brightness. There is no general commercial incentive to produce visually dark fluorescent inks for graphics purposes, so the machine-readable fluorescent ink can be a unique controlled supply item for the specific intended purpose.

These POV security markings may be produced by digital printing., thermal transfer or electrophotography. In particular, the markings may be produced with the water-based inks disclosed herein through ink jet printing.

FIG. 3 illustrates a system for validating a security marking 12. As shown in FIG. 3, a visible light source 50 is used to provide illuminating light 60 on the security marking 12. With the reflected light 70 from the security marking 12, a reflected image scanner 80 can acquire the visible image 24. Similarly, an ultraviolet light source 52 is used to provide illuminating light 62 on the security marking 12. With the fluorescent emission 72 from the security marking 12, the fluorescent image scanner 82 can acquire the fluorescent image 22. Preferably, a controlling mechanism 54 is used to coordinate the illumination by the illuminating sources 50, 52 and the image acquisition by the image scanners 80, 82. The reflected image scanner 80 and the fluorescent image scanner 82 can acquire the respective images separately and sequentially. However, it is also possible to acquire the visible image 24 and the fluorescent image 22 simultaneously when appropriate filters and optical components are used to direct the reflected light 70 and the fluorescent emission 72 to the respective image scanners. It is preferred that the fluorescent image 22 and the visible image 24 are stored in an image storage means 84, so that they can be processed and compared. As shown, a signal or image data 86 indicative of the fluorescent image 22 and a signal or image data 88 indicative of the visible image 24 are conveyed to an image processing and correlation device 90. Because the fluorescent image 22 is a "negative" image of the visible image 24 and these two images are in different colors, it is preferable to process the image data 86, 88 before comparing the image data 86, 88. For example, a software program 92 can be used to compute a value 94 indicative of the correlation between the fluorescent image 22 and the visible image 24. The correlation value 94 can then be compared to a predetermined value 96 for determining whether the fluorescent image 22 and the visible image 24 are the results of the OVD ink used to print the security marking 12. The security marking 12 can be assumed to be legally produced using the OVD ink only if the correlation value 94 is equal or greater than the predetermined value 96, for example. It should be noted that, because the fluorescent emission from the OVD ink can be limited to a certain wavelength range, it is possible to use a bandpass filter to allow only the fluorescent emission 72 in that wavelength range to reach the fluorescent image scanner 82. As such, the fluorescent emission from an illegal duplicate can be filtered out. It should be noted that the above description, taken in conjunction with FIGS. 2a to 3, is concerned with the fluorescent image and the visible image obtained from a postage stamp or indicium 12. It is understood that the fluorescent image and the visible image can be obtained from any security marking. Furthermore, while it is preferred to use an image scanner to obtain an image from the security marking, it is possible to use a digital camera or a video camera to obtain the image. It is also possible to use a film camera to obtain the image and a converting means to convert the film image to a digital image for processing.

Figure 4:
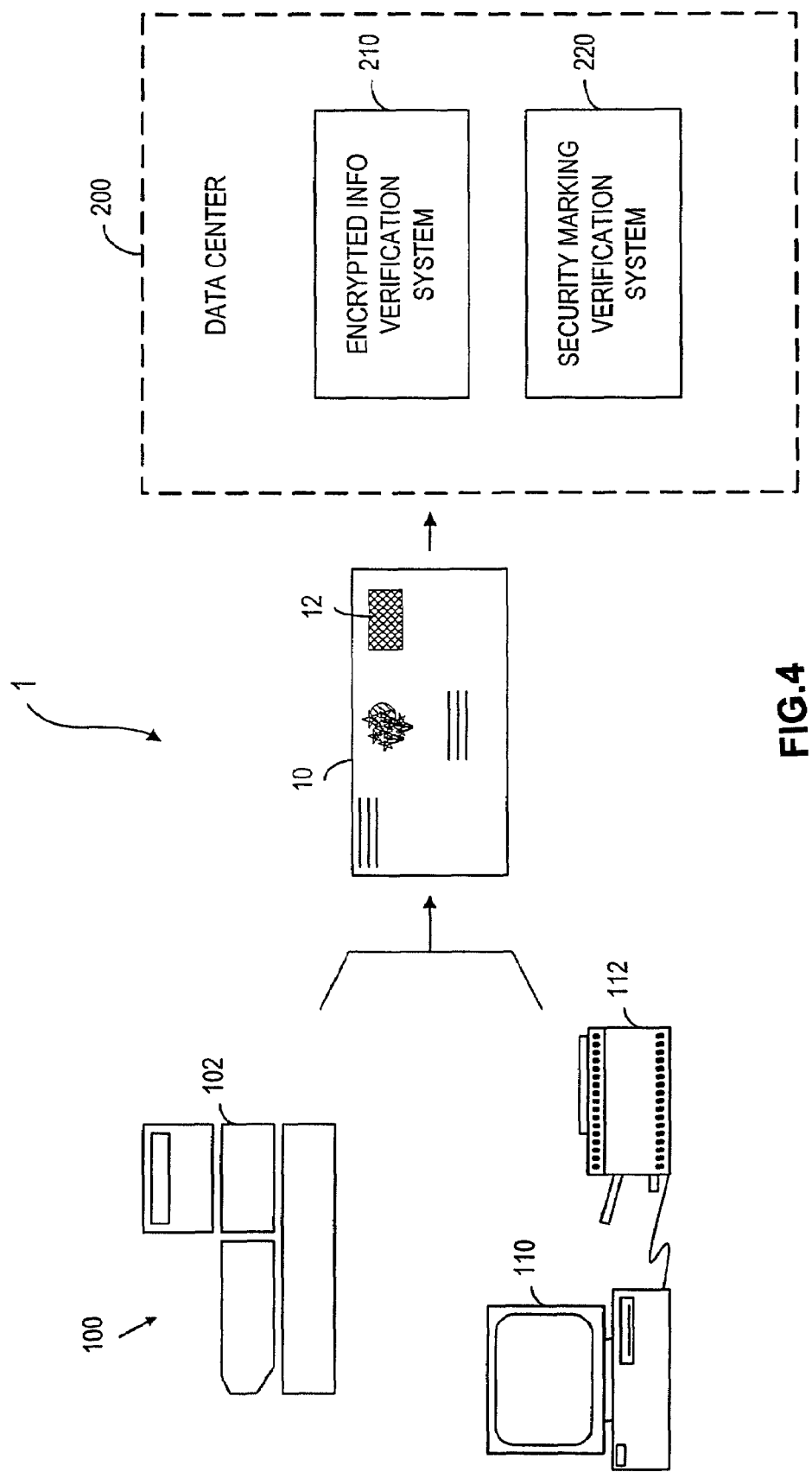
FIG. 4 is a diagrammatic representation illustrating a system for authenticating a mailpiece.

FIG. 4 illustrates an overall system for the authentication of an item using a security marking made from an OVD ink. For example, the system can be incorporated into an existing postage authentication system. As shown in FIG. 4, the system 1 includes a postage meter 100 having a print head 102 for printing a postage indicium and other mail or non-mail related information or images on the mailpiece 10. Instead of the postage meter 100, a printer 112 can be connected to a personal computer 110 to print the information or images. When the mailpiece is received by a data center 200, an encryption information verification system 210 can be used to validate the postage indicium 12 from the encrypted information contained therein. Additionally, a security marking verification system 220 can be used to verify a security marking from the fluorescent image and the visible image obtained therefrom. Preferably, the print head 102 is an inkjet print head and the printer 112 is an inkjet printer so that they can use the OVD inks as shown in Table I and Table II to print a security marking.

TABLE I

| COMPONENT | (wt. %) |
| --- | --- |
| Coumarin 7 sulphonic acid | 0.230 |
| Acid Red 52 | 0.320 |
| Pyranine 120 | 1.110 |
| Dodecylbenzene sulphonic acid | 1.120 |
| Millijet Black 2000 | 2.210 |
| 4-Methylmorpholine N-oxide | 2.520 |
| Millijet Blue 18 | 3.080 |
| Polyvinylpyrrolidone (K-12) | 4.090 |
| Triethylene Glycol Mono Butyl Ether | 8.710 |
| Triethanolamine | 0.040 |
| Distilled H2O | 76.57 |
| Total | 100.000 |

Table I shows a homogeneous, water-based OVD ink composition that absorbs visible light and produces a fluorescent emission under ultraviolet excitation. Basically, the ink composition comprises a blue colorant, amine, fluorescent soluble dye, a fluorescent enhancer, a surfactant, a polymer resin, a water-soluble organic solvent and water. In Table I, Millijet Blue 28 is a trade name for a blue dye made by Milliken & Company of Spartanburg, S.C. The homogeneous ink in Table I produces an image on white envelopes with a fluorescence intensity of 22 phosphor meter units (PMU) as defined by the USPS. The optical density of the image is 0.7 and the print contrast ration (PCR) is 60% with white illumination and 72% with red illumination.

TABLE II

| COMPONENT | (wt. %) |
|---|---|
| Lumikol Orange | 10.550 |
| Lumikol Red | 10.890 |
| Hostafine Blue B2G (solids) (Pigment Blue 15:3) | 0.820 |
| Triethylene Glycol Mono-n-butyl Ether | 2.260 |
| Glycerin | 4.510 |
| Ethlyene Glycol | 4.510 |
| Distilled H2O | 66.460 |
| Total | 100.00 |

Table II shows a heterogeneous, water-based OVD ink composition that absorbs visible light and produces a fluorescent emission under ultraviolet excitation. Basically, the ink composition comprises a blue colorant, a water-soluble organic solvent, fluorescent pigment dispersion and water. The Lumikol dispersions were obtained from United Mineral & Chemical Corp. of Lynhurst, N.J., a distributor for Nippon Keiko Kagaku of Japan. The Hostafine Blue B2G (blue pigment) is manufactured by Clariant Inc. of Coventry, R.I. The heterogeneous ink in Table II produces an image on white envelopes with a fluorescence intensity of 37 PMU. The optical density of the image is 0.86 and the PCR is 64% with white illumination and 85% with red illumination.

Figure 5:
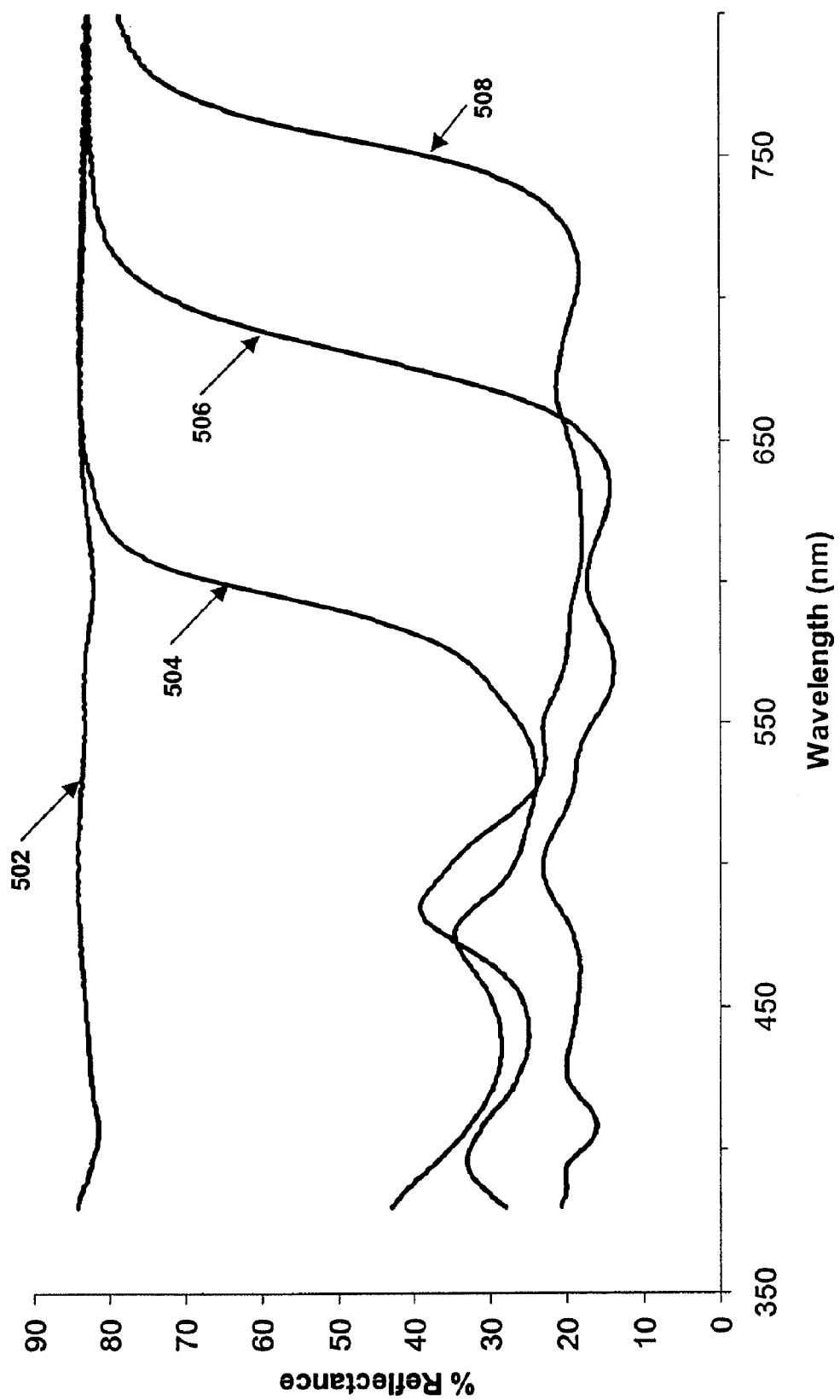
FIG. 5 is a graph of reflectivity of white paper and images printed with various inks.

Preferably, the ink absorbs visible light in the wavelength range substantially between 390 nanometers and 680 nanometers and the ink appears black, dark gray or dark blue. FIG. 5 is a graph of reflectance as a function of wavelength. The reflectance of white paper 502 is high over the whole wavelength range. The reflectance of red postage meter ink 504 is low up to about 550 nanometers and then makes a transition to highly reflective above 600 nanometers. An image scanner that is sensitive only in the red region of the spectrum will see very little contrast between the reflectance of the paper 502 and the reflectance of the red ink 504. The homogeneous ink composition shown in Table I produces an image with reflectance 506 that absorbs over the preferred wavelength range substantially between 390 and 680 nanometers. The heterogeneous ink composition shown in Table II produces an image with reflectance 508 that shows good contrast with the paper up to 750 nanometers.

Figure 6:
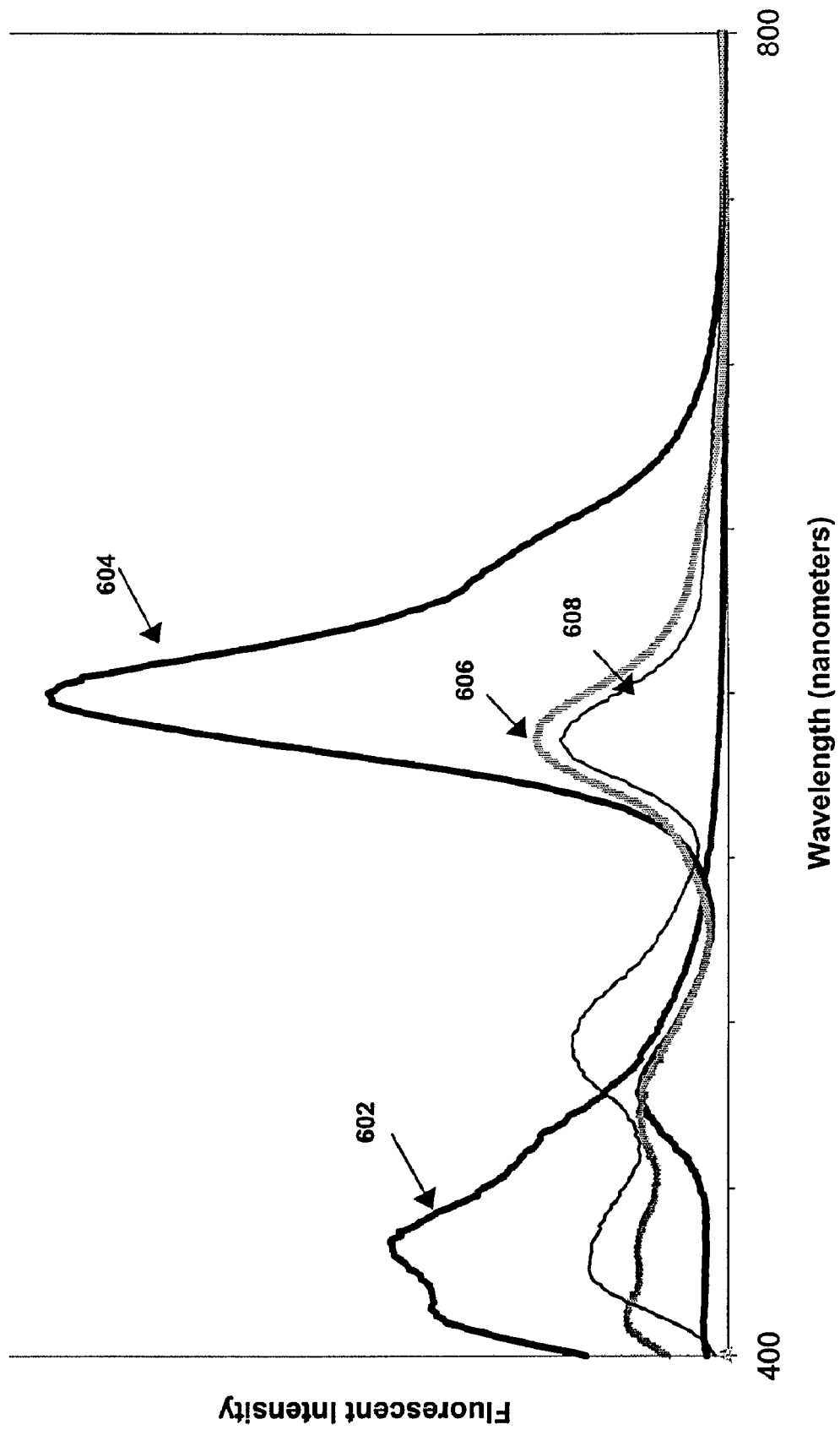
FIG. 6 is a graph of fluorescent emission of white paper and images printed with various inks.
Figure 7:
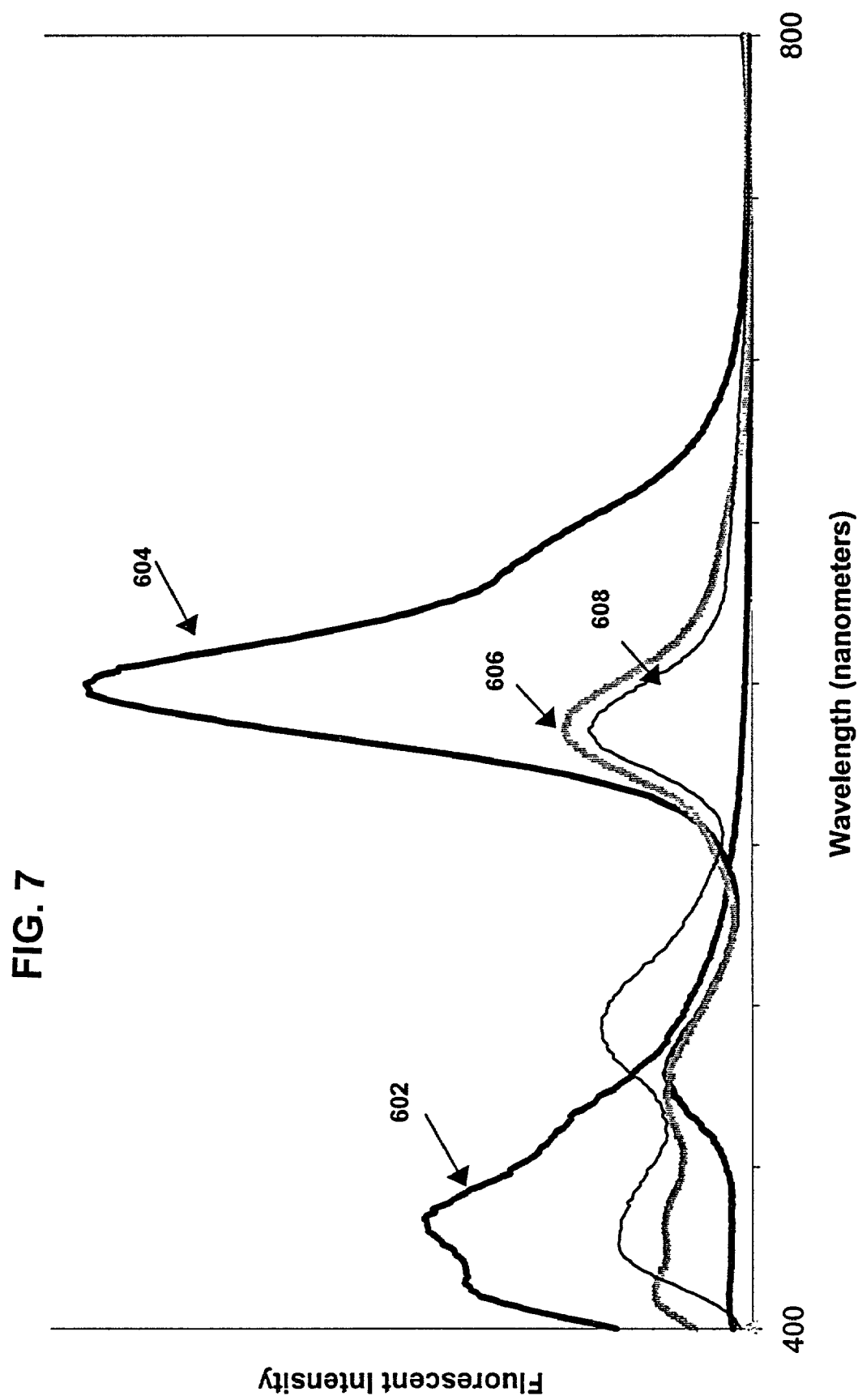

Preferably, the ink produces a fluorescent emission with a peak at a wavelength longer than 580 nanometers and the ink appears red or dark orange when excited by ultraviolet radiation. FIG. 6 is a graph of fluorescent emission of regions of an image under ultraviolet illumination. The fluorescent intensity 602 of white paper is typically concentrated below 500 nanometers. Red postage meter ink has fluorescence intensity 604 with a high peak centered above 580 nanometers. The fluorescent intensity 608 of the homogeneous OVD ink and the fluorescent intensity 606 of the heterogeneous OVD ink have peaks centered above 580 nanometers with sufficient intensity to be detected by postal facing equipment.

According to the preferred embodiment of the invention, the item to be authenticated has one or more security markings thereon, wherein the security markings are printed with an ink capable of absorbing light in the visible wavelength range to appear visibly black and producing a red-fluorescent emission under ultraviolet excitation. It should be noted that, the security markings can be produced with any medium that is capable of absorbing light in the visible wavelength range to appear visibly black and producing a fluorescent emission under any shorter wavelength excitation. For example, the medium can be a coating. It can be an analog ink, such as the ink for offset printing, manual stamping, silkscreen and flexography. The medium can also be that for digital printing using thermal transfer technology, electrophotography and inkjet printing.

Thus, the present invention is not limited to producing a red-fluorescent emission under ultraviolet excitation. The present invention includes the use of a medium that absorbs visible light in a wavelength range substantially between 330 nanometers and 800 nanometers, and that produces a fluorescent emission which is substantially between 400 nanometers and 1100 nanometers.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method for authenticating an item having a surface with a security marking printed thereon, said method comprising the steps of:
    processing with scanning equipment an item with a security marking created with a single medium capable of absorbing light in a visible wavelength range to appear visibly black, the medium also producing a fluorescent emission under excitation illumination, wherein the fluorescent emission has a first wavelength and the excitation illumination has a second wavelength shorter than the first wavelength;
    acquiring a first image of the security marking in the visible wavelength range under illumination of visible light;
    acquiring a second image of the security marking from the fluorescent emission under excitation illumination; and
    verifying authenticity of the item using the first image and the second image.

2. The method of claim 1, wherein the step of verifying the authenticity comprises determining that the first and second images are physically coincident.

3. The method of claim 1, wherein the step of verifying the authenticity comprises comparing the first image to the second image for determining a substantial match between the first image and the second image.

4. The method of claim 3, wherein said comparing step is carried out visually.

5. The method of claim 3, wherein said comparing step comprises the steps of:
    obtaining a value representative of a correlation between the first image and the second image; and
    comparing the value to a predetermined threshold.

6. The method of claim 1, wherein the medium comprises an ink.

7. The method of claim 1, wherein the medium comprises an ink which can be used in an inkjet printer for providing said security marking.

8. The method of claim 1, wherein the excitation illumination is ultraviolet excitation.

9. The method of claim 1, wherein the fluorescent emission is a red fluorescent emission.

10. The method of claim 1, wherein the item comprises a mailpiece and the security marking comprises a postage indicium.

11. The method of claim 1, wherein the item is a banknote.

12. The method of claim 1, wherein the item is a document.

13. A system for authenticating an item having a surface with a security marking printed thereon, said system comprising:
- scanning equipment for processing the item with a security marking created using a single medium capable of absorbing light in the visible wavelength range under illumination of visible light, the medium producing a fluorescent emission under excitation illumination, wherein the fluorescent emission has a first wavelength and the excitation illumination has a second wavelength shorter than the first wavelength,
- a first means, responsive to the visible light, for acquiring a first image of the security marking for providing a first signal indicative of the first image;
- a second means, responsive to the fluorescent emission, for acquiring a second image for providing a second signal indicative of the second image; and
- a third means, responsive to the first signal and the second signal, for verifying authenticity of the item using the first image and the second image.

14. The system of claim 13, wherein the third means determines that the first and second images are physically coincident.

15. The system of claim 13, wherein the third means compares the first image to the second image for determining a substantial match between the first image and the second image.

16. The system of claim 13, wherein the third means comprises a correlating means for obtaining a value indicative of the match between the first image and the second image, and said value is used to determine the match based on a predetermined threshold.

17. The system of claim 13, wherein the first means comprises an image scanner.

18. The system of claim 13, wherein the first means comprises a digital camera.

19. The system of claim 13, wherein the first means comprises a video camera.

20. The system of claim 13, wherein the second means comprises an image scanner.

21. The system of claim 13, wherein the second means comprises a digital camera.

22. The system of claim 13, wherein the second means comprises a video camera.

23. The system of claim 13, further comprising a printer for printing the security marking.

24. The system of claim 13, further comprising an inkjet printer for printing the security marking.

25. The system of claim 13, further comprising a visible light source for illuminating the security marking.

26. The system of claim 13, further comprising an ultraviolet light source for providing ultraviolet excitation to the security marking.

27. The system of claim 26, wherein the fluorescent emission is in a first wavelength range and the ultraviolet light source provides light in a second wavelength range which is shorter than the first wavelength range.

28. The system of claim 27 wherein the first wavelength range is between 400 and 1100 nanometers.

* * * * *